Patented Mar. 6, 1951

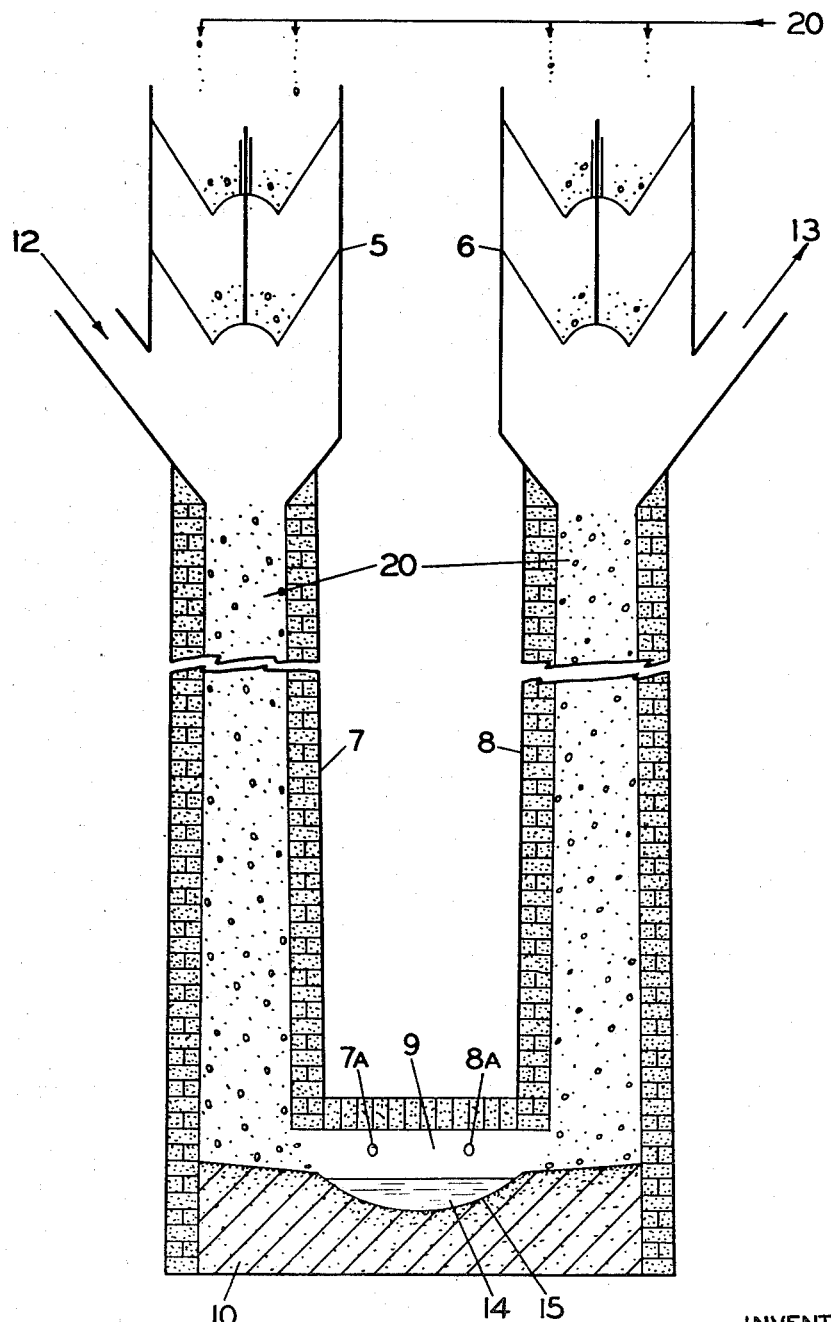

2,544,091

UNITED STATES PATENT OFFICE 2,544,091

METHOD OF MELTING

James Fernando Jordan, Huntington Park, Calif., assignor to Jordan Research Laboratory, Inc., Huntington Park, Calif., a corporation of Nevada Application May 10, 1948, Serial No. 26,100

3 Claims. (Cl. 263—52)

This is a continuation-in-part of Serial No. 717,072, filed on December 18, 1946, later abandoned, and of the copending Serial No. 729,621, filed on February 19, 1947, later abandoned.

My invention relates to the art of melting high-melting-point materials.

Modern melting furnaces which utilize carbonaceous fuel are not efficient, nor are they capable of attaining the high temperatures required when certain high-melting-point materials are to be melted.

I have discovered a melting process wherein carbonaceous fuel may be employed efficiently to melt high-melting-point materials. My process consists of a reversing regenerative system that employs the material that is being melted as the heat-storing medium of the regeneration.

The single figure shows a furnace of the type wherein my process may be carried out.

The expression "air" is employed in this specification and the claims to denote any oxygen-bearing gas that will support combustion.

The expression "concentrated oxygen" is employed herein to denote any oxygen-bearing gas that contains more than 25% oxygen, by volume.

Regenerative-melting processes are characterized by three basic elements: two heat-storing mazes, and a connecting combustion chamber. Conventional arrangements usually consist of two mazes constructed of firebrick and a connecting combustion chamber within which the melting operation takes place.

It has been occasionally proposed that the regenerative mazes be composed of columns of the material that is to be melted; the melting operation being carried out either within the combustion chamber or at the base of one, or both, of the regenerative columns. None of the proposals involving the use of regenerative mazes composed of the material that is being melted have assumed any importance within industry—this, in spite of the compelling advantages proffered by such an arrangement. I have discovered how to operate such a regenerative-melting furnace so as to achieve all of the advantages from such mazes.

In my process, regenerative towers 7 and 8 contain a charge of the material 20 that is to be melted; said material 20 having been introduced into towers 7 and 8 through the double-bell hoppers 5 and 6. Assuming that material 20 lying within towers 7 and 8 is preheated to a red heat, I operate my process by passing air 12 down through the column of material 20 within tower 7; said air 12 being preheated as it descends. When air 12, now hot, reaches the base of tower 7 it passes into combustion chamber 9, whereupon the fuel is introduced into the hot air stream by means of port 7A. The fuel may be gaseous, liquid, or finely-divided solids, and is ordinarily cold. The combustible mixture of hot air 12 and fuel now sweeps through chamber 9, burning as it goes. The hot combustion products plunge into the base of material 20 that is lying within tower 8, causing said material 20 to melt and flow into the basin 15 that forms the floor of chamber 9. The heat that is not consumed in melting material 20 passes on up thru the column of material 20 that is lying within tower 8, being absorbed and stored within this column of material 20. Waste combustion products 13, now cooled, pass out of tower 8 at, or near, the top of said tower. The flow of gases 12 and 13 through the columns of material 20 is a forced flow induced by suitable blowers and/or aspirators (not shown) that are connected to towers 7 and 8.

The flow of gases 12 and 13 is continued as shown in the figure until the temperature of the preheated air has fallen to a level that inhibits the melting operation that is taking place at the base of tower 8, whereupon the flow of air 12 and waste gases 13 is reversed. Now, incoming air 12 is forced down through material 20 that is lying within tower 8, being preheated as it descends. When preheated air 12 reaches the base of tower 8 it passes into chamber 9, whereupon the fuel is introduced into the hot air 12 thru fuel port 8A. The combustible mixture now sweeps thru chamber 9, burning as it goes. Plunging into the base of the column of material 20 that is lying within tower 7, the hot combustion products melt material 20, and the melted material 20 flows into pool 14 within basin 15. The heat that is not consumed in melting material 20 at the base of tower 7 passes on up thru the column of material 20, being absorbed and stored within said column of material 20. Products 13 leave tower 7 at, or near, the top of said tower.

Summarized, the action of my process is as follows: When the left-hand tower is being employed to preheat the incoming air, the melting zone lies at the base of the right-hand tower and the waste heat from said melting zone is being accumulated in the upper levels of said right-hand tower. Upon reversal, the right-hand tower assumes the role of the preheater of the incoming air, while the left-hand tower melts and accumulates. At the instant of each regenerative reversal, the two regenerative towers exchange their respective responsibilities. Throughout the whole process the fuel is always added to the preheated air stream within the combustion chamber 9, and in such a fashion that the insuing combustion reactions are substantially completed within said chamber 9.

The combustible mixture that supplies the energy for the melting action consists of two components: fuel and air. My regenerative-melting process employs the waste heat from the melting operation to preheat the incoming material 20 and one of these combustion components. Inasmuch as the waste heat is employed to preheat only one of the combustion components, that component which possesses the greatest heat capacity should be selected for preheating. In the case cited, it was assumed that the fuel being employed was high grade, with the result that the air component possessed the greater heat capacity in that combustible mixture, and, accordingly, it was the air component that was preheated by passing it down through the regenerative column.

There are circumstances wherein it may be desirable to preheat a gaseous fuel instead of the air. Thus, for example, if low-grade gaseous fuel and concentrated oxygen are available; or when a metal that is readily oxidized by air is to be melted. In such cases, the gaseous fuel is preheated by passing it down through the preheat column, and the oxygen is introduced into the preheated fuel after said fuel enters the combustion chamber. In order to be suitable for preheating, gaseous fuel should be free from compounds which will crack at the preheat temperatures.

It is vital to the success of my process that the full energy content of the combustible mixture be released as heat before the resulting hot gases are permitted to contact unmelted material 20. This is why the second combustion component is introduced into the preheated component after said preheated component has entered combustion chamber 9. In no case should the second component be introduced into the preheated component so that the resulting combustion reactions take place in contact with unmelted material 20 that lies at the base of the preheat column. There is no surer way to dissipate the efficiency of a melting process than to permit the burning combustible mixture to contact unmelted material before the combustion reactions are complete—as evidenced, in general, by the disappearance of the flame. To permit the flame-like evidence of incomplete reactions to contact unmelted material robs the combustion reactions of that energy upon which the melting operation is depending for its high-temperature heat—its available heat. It is the confined release of the total energy content of the combustible mixture that gives rise to the maximum temperatures. If a portion of this total energy is utilized for purposes other than the attainment of the maximum temperature—such as the heating of unmelted material—the maximum temperature will obviously never be realized, for the hot gases will have been quenched.

Accordingly, the preheated combustion component is not mixed with the second component until after the preheated component has entered the combusion chamber. Furthermore, it is the sense of the matter that the combustion reactions which insue after the components are brought together are substantially completed before the combustion gases plunge into the melting zone; for, if these gases still contain the flame-like evidences of incomplete reactions, then the maximum temperature has not been attained. Inasmuch as the material lying in the pool within the combustion chamber has already been melted, my process makes no effort to further heat this material—the objective being, rather, to get the heat values through the combustion chamber as intact as possible. Obviously, due to the very high temperatures prevalent within the combustion gases flowing through the combustion chamber, a certain measure of superheating of pool 14 will take place, especially if the pool is allowed to remain in basin 15 for very long.

My process acts to make available to the actual melting process practically all of the energy content of the combustible mixture—the actual melting process being the process of supplying to a solid that energy known as the latent heat of fusion. The melting process does not require any great amount of heat, but that which it does require must be high-temperature heat. The preheating of the material up to its melting point is incidental to the basic melting process, not only theoretically, but also from the practical point of view, for all melting processes employing carbonaceous fuel have an excess of preheating capacity—thus, none of the furnaces have any trouble preheating the material up to, or close to, the melting point; the real difficulty lies in getting the material over the melting point.

In my process, with the regenerative cycles operating on frequent reversals, the incoming air will be preheated to a temperature that will lie below, but close to, the melting point of the material that is being melted. When, then, the fuel component is introduced into this highly preheated air, and the insuing reactions are allowed to proceed to completion out of contact with unmelted material, it is obvious that most of the energy content of the combustible mixture will be released at levels which will be above the critical level of the process—in other words, above the melting point of the material. And it is important to note that it is the melting point of the material that is being melted that controls the top temperature to which the process will reach. Insofar as my process is concerned, it does not matter what type of material is being melted; but, of course, the furnace in which my process is being carried out will be highly sensitive to the type of material that is being melted. With the high-melting point class of materials, the refractory arrangement shown in the figure will not stand up. Thus, for example, if the process is melting magnesium oxide—melting point 5072° F.—the air will be preheated to some temperature under this melting temperature, say to 4500° F. Into this white-hot air blast will be introduced a high-grade fuel. The resulting combustion reactions will carry the gas mixture to temperature levels which will lie far above 5072° F. When melting such high-melting point materials, the furnace must be constructed in the ways and manner known to be required for high-temperature operations—such as, for example, with the aid of water-cooled refractories and bare water-jackets.

The expression "material" is employed within the specification and claims to denote any metal or any non-metallic substance that melts to form a free-flowing liquid, said material being the substance that is to be melted within my melting furnace.

I claim as my invention:

1. In the reversing regenerative melting process of the class described wherein two loosely-packed columns of the material that is to be melted at the bases thereof are preheated while being alternately employed to accumulate waste heat from and return said waste heat to the combustion chamber that connects said columns at said bases, the method of operation, which comprises: preheating a gaseous component of the combustible mixture that is to be burned within said combustion chamber by flowing said gaseous component down through one of said columns; mixing substantially all of the components which comprise said combustible mixture after said gaseous component has emerged from the base of the preheating column and has entered said combustion chamber; burning substantially all of the resulting combustible mixture out of contact with said columns, by burning substantially all of said combustible mixture within said combustion chamber; melting the unmelted material that forms the base of the other column by flowing the hot combustion gases from said combustion chamber into the base of and then up through said other column; and removing the melted material from the base of said other column by flowing said melted material into said combustion chamber.

2. The process according to claim 1 in which the gaseous component being preheated is air.

3. The process according to claim 1 in which the gaseous component being preheated is a fuel gas.

JAMES FERNANDO JORDAN.

REFERENCES CITED

The following references are of record in the file of this patent:

UNITED STATES PATENTS

| Number | Name | Date |
| --- | --- | --- |
| 166,757 | Eustis | Aug. 17, 1875 |
| 166,977 | Eustis | Aug. 24, 1875 |
| 475,398 | Heckert | May 24, 1892 |
| 688,651 | Kirk | Dec. 10, 1901 |
| 1,724,783 | Smallwood | Aug. 13, 1929 |